May 14, 1963 J. R. WOOD 3,089,645

ARITHMETIC ELEMENT

Filed June 30, 1959 2 Sheets-Sheet 1

INVENTOR
JAMES R. WOOD

BY Joseph J. Connerton
ATTORNEY

May 14, 1963 J. R. WOOD 3,089,645

ARITHMETIC ELEMENT

Filed June 30, 1959 2 Sheets-Sheet 2

3,089,645
ARITHMETIC ELEMENT
James R. Wood, Poughkeepsie, N.Y., assignor to International Business Machines Corporation, New York, N.Y., a corporation of New York
Filed June 30, 1959, Ser. No. 823,930
9 Claims. (Cl. 235—175)

Figures 1, 1A:
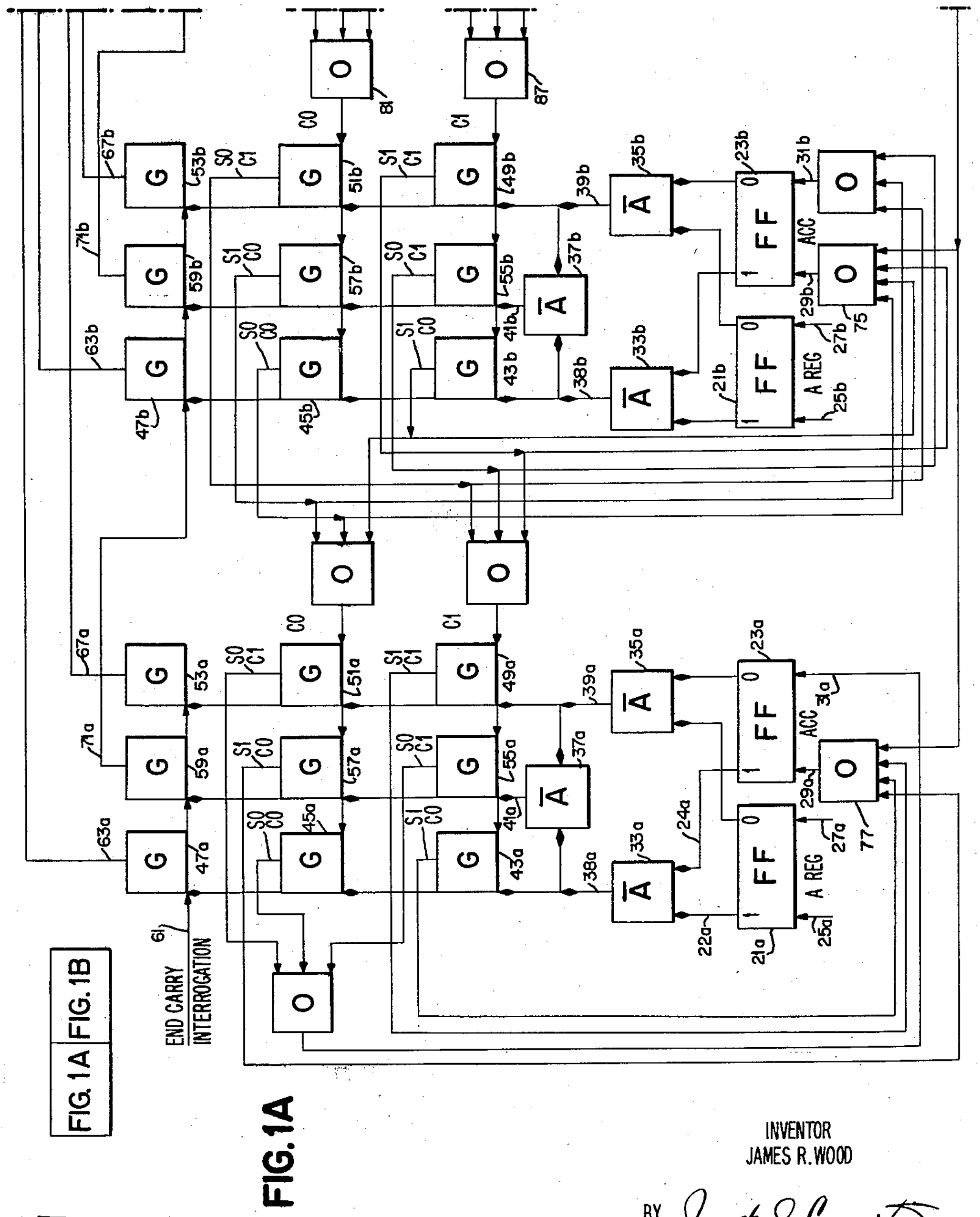

The present invention relates to apparatus adapted to perform arithmetic functions in electronic computer system and more particularly to a high-speed adder circuit.

In the design of electronic computers, one of the primary problems entailed is the type of arithmetic element to be utilized. The considerations upon which such a selection is based will depend in general on the desired speed of operation, the arithmetic operations to be performed and the relative frequency of such operations. Operating speed of the computer and associated peripheral units as well as the amount of equipment required are also included among the considerations. Based on such criteria, a particular type of adder, the basic unit of the arithmetic element in a computer, will be selected.

In a computer designed primarily for calculating as contrasted with one designed primarily for data processing, speed of multiplication may become a primary consideration, since multiplication is one of the more time consuming operations performed by a computer. One method which may be utilized for relatively fast multiplication time is the ripple adder approach. This approach basically entails an adder that permits a ripple addition, that is, the formation of several partial products in a serial or end to end fashion. Such adders are known in the digital computing art, one example being shown in copending application Serial Number 414,459, now Patent No. 2,994,478, filed by Bernard L. Sarahan et al. on March 5, 1954. In addition to relatively fast multiplication speed, ripple type carry adders are readily adaptable for checking, since a carry one or carry zero signal is generated by each stage of the adder. The absence of such a carry signal could be readily detected to provide an indication of malfunction. However, one disadvantage associated with such type adders is that when an end around carry occurs, it is necessary to do a second addition cycle thereby effectively doubling the time required for addition. The present invention overcomes this limitation by predicting whether or not an end around carry will occur and based on such prediction initiating the add operation. In order to predict whether an end around carry will occur in one's complement arithmetic during the addition of two binary numbers, there must be a comparison between at least one set of bits of the same order in the augend and in the addend. The presence or absence of an end around carry is determined by successive examination of the addend and augend positions from high order to low order. The highest order bits which compare determine if the end around carry will be a "one" or a "zero." As more fully described hereinafter, the carry zero signal merely functions to initiate the add cycle in the absence of an end around carry. If the compared bits in the addend and augend are two ones, then an end around carry will take place. If the compared bits are two zeros, then no end around carry will take place.

The present invention performs this comparison of the bits as part of the add cycle, in that determination of an end carry is a prerequisite to initiating the add operation. A series of carry prediction gates are selectively conditioned by the outputs from the associated addition circuitry in each bit position. An interrogation pulse samples the prediction gates successively from the highest order bit. If corresponding bits in both the addend and augend are binary one's, the addition is started with the carry one signal. If both the addend and augend are binary zero's, the addition is started with the carry zero signal. If the augend and addend are unlike, i.e., a 1, 0 or 0, 1, the interrogation pulse is propagated successively through the lower order bits until a comparison is found, at which time the addition would begin with the proper end carry. By means of the present invention, the average time for a complete addition is substantially reduced, and the second addition cycle normally required with a conventional carry ripple adder is eliminated.

Accordingly, a primary object of the present invention is to provide an improved high-speed adder circuit.

Another object of the present invention is to provide an improved binary adder utilizing end carry prediction for effecting the addition operation.

A further object of the present invention is to provide a carry ripple adder adapted to add in a single cycle by initially predicting whether an end carry will take place prior to the add operation.

Still another object of the present invention is to provide an improved carry ripple adder in which the prediction of the proper carry is used to initiate the add operation.

Other objects of the invention will be pointed out in the following description and claims and illustrated in the accompanying drawings, which disclose, by way of example, the principle of the invention and the best mode, which has been contemplated, of applying that principle.

Figure 1B:
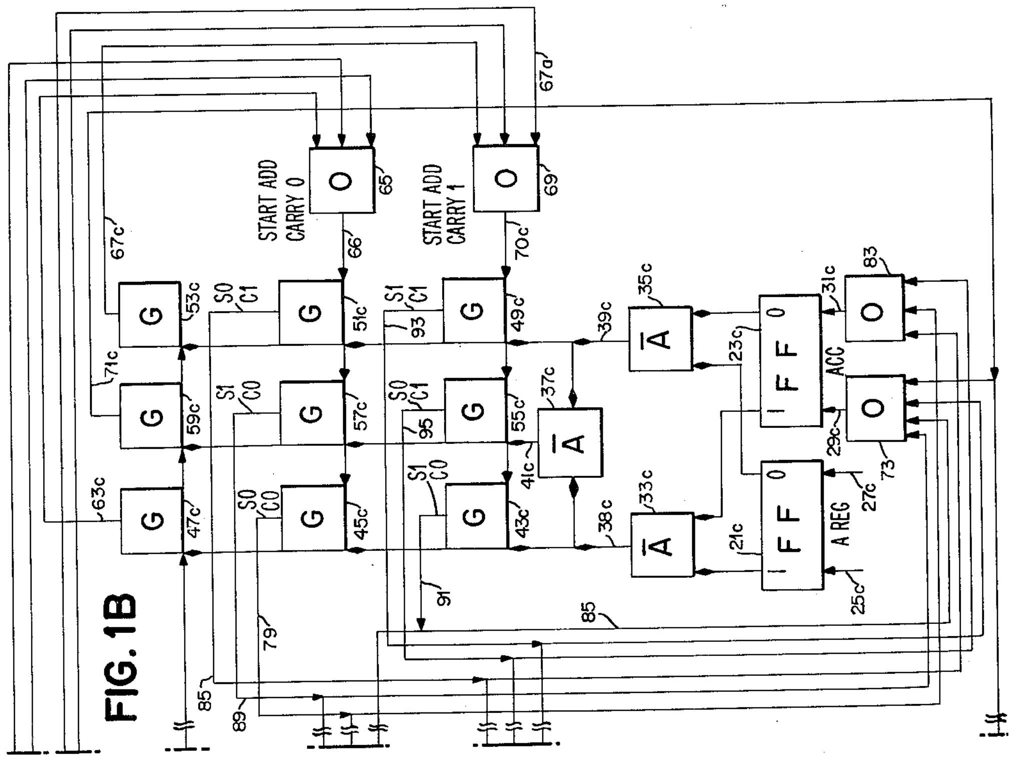

In the drawings:

FIGURES 1*a* and 1*b* when arranged as shown in FIGURE 1 comprise a logical diagram of an adder circuit utilized in the preferred embodiment of the present invention.

Figure 2:
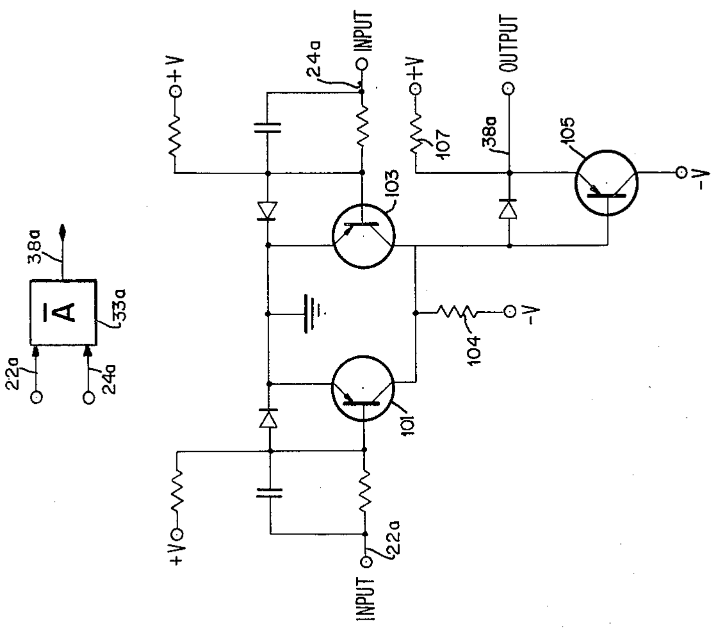

FIGURE 2 illustrates in schematic form a logical And Not ($\bar{A}$) circuit of the type shown as bock 33A in FIGURE 1*a*.

Throughout the following description and in the accompanying drawings there are certain conventions employed which are familiar to certain of those skilled in the art. Additional information concerning these conventions is as follows:

In the block diagram figures of the drawing, a conventional arrowhead is employed on lines throughout the drawing to indicate (1) a circuit connection (2) energization with a pulse and (3) the direction of the pulse transfer which is also the direction of control. A diamond-shaped arrowhead indicates (1) a circuit connection (2) energization with a D.C. level. Boldface character symbols appearing within a block symbol indicating a common name for the circuit represented, that is, FF indicates a flip-flop, G a gate circuit, OR a logical OR circuit and $\bar{A}$ a logical And Not circuit.

The adder circuitry shown in FIGURES 1*a* and 1*b* includes an Addend Register comprising flip-flops **21*a*, 21*b* and 21*c* hereinafter designated A Reg and an Augend Register comprising flip-flops 23*a*, 23*b* and 23*c*, hereinafter designated Accumulator. While a three stage adder is utilized to describe a preferred embodiment of the instant invention, it will be readily understood that the adder may be expanded to any desired number of stages by merely combining the requisite number of similar stages. The binary number representing the addend is loaded into the A Reg by selectively pulsing the 1 and 0 input lines 25 and 27 respectively from a pulse source, not shown. The binary number representing the augend is placed in the accumulator in like manner by selectively pulsing the 1 and 0 input lines 29 and 31** respectively. The specific pulse inputs used to load the accumulator are more fully described hereinafter.

Before describing the and carry prediction circuitry and to facilitate an understanding of the subject invention, the operation of the basic circuits shown in FIGURE 1 utilizing negative logic will be briefly described. An $\overline{\text{AND}}$ circuit is a logical circuit which provides a negative output when both inputs are positive. The flip-flops (FF) herein employed when set to the "1" or "0" state by negative pulses provide negative signals in the corresponding "1" or "0" outputs. Gate circuits employed in the present invention are adapted to pass negative pulses when suitably conditioned by negative D.C. levels. Logical OR circuits will provide a negative output if one or more of the inputs is negative.

Each stage of the A Reg and Accumulator stages are provided with a comparator circuit comprising $\overline{\text{AND}}$ circuits 33, 35 and 37 which compare corresponding bits of the A Reg and Accumulator. Referring specifically to the highest order stage where the comparison is initiated, the "1" outputs from the A Reg 21*a* and the Accumulator 23*a* are connected to the inputs of $\overline{\text{AND}}$ circuit 33*a*; the "0" outputs from the A Reg and Accumulator are connected to the inputs of $\overline{\text{AND}}$ circuit 35*a*, so that the inputs of $\overline{\text{AND}}$ circuits 33*a* and 35*a* can be said to be connected to corresponding outputs of flip-flops 21*a* and 23*a*; while the outputs of $\overline{\text{AND}}$ circuits 33*a* and 35*a* are combined through $\overline{\text{AND}}$ circuit 37*a*. It will thus be appreciated that a negative output will be provided from $\overline{\text{AND}}$ circuit 33*a* when the status of the associated A Reg and Accumulator stage is 00. A negative output will be provided from $\overline{\text{AND}}$ circuit 35*a* when the status of the A Reg and Accumulator stages is 11. If the comparison indicates that neither of the above two conditions occur, a positive output will be provided on conductors 38*a* and 39*a* which will provide a negative output from $\overline{\text{AND}}$ circuit 37*a* on conductor 41*a* if the status of flip-flops 21*a* and 23*a* is either 10 or 01. The output level from $\overline{\text{AND}}$ circuit 33*a* conditions gate circuits 43*a*, 45*a* and 47*a*; the output level from $\overline{\text{AND}}$ circuit 35*a* conditions gate circuits 49*a*, 51*a* and 53*a*, while $\overline{\text{AND}}$ circuit 37*a* conditions gate circuits 55*a*, 57*a* and 59*a*. With respect to the end carry prediction, depending on the status of the A Reg and Accumulator stages 21*a* and 23*a*, one and only one of gate circuits 47*a*, 53*a* and 59*a* will be conditioned. When an end carry interrogation signal is applied to conductor 61, an output will be provided from the particular gate circuit which is conditioned. Assuming gate circuit 47*a* is conditioned, for example, indicating that the status of the A Reg and Accumulator stages 21*a* and 23*a* is 00, it will be evident that an end carry could not be generated under any circumstances and the resultant output signal from gate circuit 47*a* indicating carry 0 will be applied through conductor 63*a* to logical OR circuit 65. Assuming gate circuit 53*a* is conditioned, indicating the status of the A Reg and Accumulator stages 21*a* and 23*a* is 11, it will be evident that an end carry will be generated under all circumstances irrespective of the condition of the lower order stages. Under this condition, sampling of gate circuit 53*a* by the end carry interrogation signal on conductor 61 will produce an output on conductor 67*a* which is applied to logical OR circuit 69, which constitutes the carry 1 input to initiate adder operation. If gate circuit 59*a* is conditioned by the 10 or 01 status of the A Reg and Accumulator stages 21*a* and 23*a*, the resultant output signal on conductor 71*a* will be propagated to the next lower order stage to sample gate circuits 47*b*, 53*b* and 59*b*.

From the above description, it will be apparent that if an identity is established by the outputs of the A Reg and Accumulator flip-flops 21*a* and 23*a*, the inspection is automatically terminated, the end carry prediction is completed and the end carry will be applied to OR circuit 65 or 69 depending on whether it is a zero or a one. The output from OR circuits 65 and 69 initiate operation of the adder.

Assuming that the end carry interrogation pulse propagates through successive stages to the lowest order of the A Reg and Accumulator, and further assuming that no identity is established in this stage, the resultant output from gate circuit 59*c* will be applied through conductor 71*c* to logical OR circuits 73, 75 and 77 to set all stages of the Accumulator in the one state, since the sum of the addend and augend numbers is a series of consecutive ones. The outputs from gate circuits 47*b* and 47*c* are likewise connected through conductors 63*b* and 63*c* to the logical OR circuit 65, while the outputs from gate circuits 53*b* and 53*c* are likewise connected through conductors 67*b* and 67*c* to logical OR circuit 69.

Summarizing the above described carry prediction operation, the presence or absence of an end carry in addition is determined by successive examination of the addend and augend positions from the highest to the lowest order. When the first position where the bits compare is encountered, a determination of whether or not an end carry will result is made; if the bits contain ones, an end carry will result, if the bits contain zeros, no end carry is possible.

In operation, the addition process is initiated upon determination of whether or not an end carry will be required. Following this determination, a signal will be applied through logical OR circuits 65 or 69 depending upon whether the end carry is zero or one. One set of gate circuits 43*c*, 45*c*; 49*c*, 51*c*; 55*c*, 57*c* will be conditioned depending upon the status of the A Reg and Accumulator in the lowest order. Assuming that a carry zero signal is applied through logical OR circuit 65, the signal on conductor 66 samples gate circuits 45*c*, 51*c* and 57*c*. An output from gate circuit 45*c* on conductor 79 will indicate a sum 0 and a carry 0. This signal is applied through logical OR circuit 81 to the next higher order as a carry 0 signal, and simultaneously applied through logical OR circuit 83 to set flip-flop 23 to the zero state indicating the lowest order of the Accumulator is in the zero state.

If the add operation is initiated by the carry 0 output from logical OR circuit 65, an output from gate circuit 51*c* on conductor 85 indicates a sum of 0 and a carry of 1, since gate circuit 51*c* is conditioned only when the associated A Reg and Accumulator stages are in the one state. The resulting output on conductor 85 is applied as an input to logical OR circuit 87 which represents the carry 1 input for the next higher order stage. This input is also applied through logical OR circuit 73 to set the Accumulator stage 23*c* in the one state. Assuming gate circuit 57*c* is conditioned, indicating either a 10 or a 01 condition of A Reg and Accumulator stages 21*c* and 22*c*, the resulting output on conductor 89 indicates a sum of 1 and carry of 0. This output is applied to logical OR circuit 81 representing the carry 0 input to the next higher stage and simultaneously applied through logical OR circuit 73 to set the Accumulator stage 23*c* in the one state indicating a sum of 1.

If the addition is initiated by a carry 1 signal from logical OR circuit 69, the signal on conductor 70 will sample gate circuits 43*c*, 49*c* and 55*c*, one of which will be conditioned. An output on conductor 91 from gate circuit 43*c* indicates a sum of 1 and a carry of 0; an output on conductor 93 from gate circuit 43*c* indicates a sum of 1 and a carry of 1; an output on conductor 95 from gate circuit 55*c* indicates a sum of 0 and a carry of 1. In like manner as above-described, these outputs will be applied to the carry 0 or carry 1 inputs to the next higher order stage, and will be likewise applied to the designated input to Accumulator stage 23*c*.

The above-described sequence is repeated stage by stage in an identical manner as above described, the carry signals being propagated to the next higher stage and the sum signals being stored in the Accumulator, so that upon completion of the add operation the sum of the addend and augend will be found in the Accumulator designated as flip-flops 23*a*, 23*b* and 23*c*. By means of the above-described operation, a ripple carry addition is provided in a single operation including the end around carry thereby permitting a substantial reduction in the time required by prior art devices utilizing a complete add cycle for the end around carry, since the time required for carry prediction by sampling the carry prediction gates 47, 53 and 59 is relatively short compared to the time required for the second add cycle.

Referring now to FIGURE 2, there is illustrated in schematic form a logical And Not ($\overline{\text{AND}}$) circuit 33*a* of the type shown in block form in FIGURE 1. The $\overline{\text{AND}}$ circuit responds to positive D.C. level inputs at or above ground potential on both conductors 22*a* and 24*a* to provide a negative output level on conductor 38*a*. If a positive or ground potential level is applied to the input line 22*a* shown in the lower portion of FIGURE 2, transistor 101 is rendered non-conductive. If at the same time another positive potential is applied to the input line 24*a*, transistor 103 is rendered non-conductive. When both transistors 101 and 103 are rendered non-conductive, the negative source of supply connected to the resistor 104 is then applied to the base of a third transistor 105, which is then rendered conductive and the output level on conductor 38*a* drops to a negative value. The resistor 107 and its positive potential source in conjunction with resistor 104 and its negative potential source constitutes a voltage divider network. The values of these resistors and their voltage sources are selected so that the output level on the conductor 38*a* is below ground potential. Accordingly, it is seen how two input levels which are positive may operate the $\overline{\text{AND}}$ circuit 33*a* to provide a negative output signal. If either line 22*a* or 24*a* receives a negative signal, the associated transistors 101 or 103 are rendered conductive and the upper end of resistor 104 is effectively connected to ground. In such cases, the base of the transistor 105 is connected to ground also. The transistor 105 is connected in an emitter follower configuration and it is readily apparent that if the base is at ground potential, the output line 38*a* is also at ground potential. Hence, if only one of the input lines 22*a* or 24*a* is positive, the output line 38*a* is likewise rendered positive at or above ground potential.

While a binary adder has been illustrated and described as the preferred embodiment of the present invention, the principle of the subject invention is not limited to binary counters but may be extended to any radix system counter having an end around carry or fugitive one signal.

Various basic circuits have been shown in block form in the drawings and so described throughout the preceding description. While circuits having the heretofore described operating characteristics could be employed, the flip-flops, gate circuits and logical OR circuits are preferably of the type shown and described in the copending application, Serial Number 824,105 entitled, "Asynchronous Multiplier," filed by Charles J. Tilton on June 30, 1959.

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. An adder circuit comprising a first register to store signals representative of an addend, a second register adapted to store signals representative of an augend, means for successively sampling said adder stages in a descending sequence commencing with the highest order stage, said sampling means being adapted to generate a signal for each stage sampled indicative of the identity of corresponding stages of said addend and augend registers and means responsive to said signal for effecting the addition operation.

2. An adder circuit comprising a first register to store signals representative of an addend, a second register adapted to store signals representative of an augend, means for successively sampling said adder stages in a descending sequence commencing with the highest order stage, said sampling means being adapted to generate a signal from each stage sampled indicative of the identity of corresponding stages of said addend and augend registers and means responsive to said signal for initiating the addition operation.

3. An adder circuit comprising a plurality of stages, each of said stages having a first and second bi-stable device, said first bi-stable devices comprising a register adapted to store signals representative of an addend, said second bi-stable devices comprising a register adapted to store signals representative of an augend, means for successively sampling each stage of said adder in a descending sequence commencing with the highest order stage, said sampling means being adapted to generate a signal for each stage sampled indicative of identity of corresponding stages of said augend and addend register, and means responsive to said signal applied to the least significant stage of said adder for effecting the addition operation.

4. The adder circuit as claimed in claim 1 in which the sampling means includes a half adder circuit associated with each stage adapted to provide a half-add output indicative of the state of the two bi-stable devices associated with the stage comprising a plurality of sensing circuits, each of said circuits having two input terminals and an output terminal and providing a conditioning output only when neither of its input terminals are conditioned, the input terminals of two of said sensing circuits being connected to corresponding output values of said bi-stable devices, the input terminals of a third sensing circuit being conditioned by the outputs of said two circuits, a gate associated with each output terminal and conditioned by said output from the associated sensing circuit, said gates being arranged to be sampled by a pulse generated by pulse sampling means and to pass a carry One signal to the least significant stage of the adder if both bi-stable devices are set to One value, a carry Zero signal if both bi-stable devices are set to the opposite value and to pass the sampling pulse to the next less significant stage if the bi-stable devices are set to different values.

5. A circuit adapted to provide a half-add output indicative of the state of two bi-stable devices comprising first, second and third sensing circuits, each of said circuits having two inputs and a single output, the input terminals of said first and second sensing circuits being connected to corresponding output values of said bi-stable devices, the input terminals of said third circuit being connected to the outputs of said first and second circuits, the output of said first, second and third sensing circuits providing a half-add output indicative of the state of said bi-stable devices.

6. A half-adder circuit of the type claimed in claim 5 wherein said sensing circuits comprise logical AND NOT circuits adapted to provide a conditioning output signal indicative of the value of said input signals.

7. An add function generator circuit adapted to provide an output indicative of the values AB, $\overline{AB}$ or $\overline{A}B+A\overline{B}$ comprising A and B bi-stable devices and three sensing circuits, each of said circuits having two input terminals and an output terminal and adapted to provide a conditioning output only when neither of its input terminals are conditioned, the input terminals of two of said circuits being connected to corresponding output values of said bi-stable devices and the inputs of the third circuit being conditioned by the outputs of said two circuits, the outputs of said circuits providing an indication of the values AB, $\overline{AB}$ and $\overline{A}B+A\overline{B}$.

8. A ripple carry adder circuit comprising a first and second register adapted to store signals representative of of an augend and an addend respectively, each of said registers comprising a plurality of bistable devices, means for comparing corresponding successive stages of said registers starting at the most significant stage, means responsive to said comparing means for determining the end around carry of said ripple carry adder circuit and generating a signal indicative thereof, and means responsive to said signal for initiating a half add sequence of the signals stored in said first and second registers.

9. A device of the character described in claim 8 wherein said signal indicative of said end around carry comprises a carry one signal when said stages being compared are in the one state or a carry zero signal when said stages being compared are in the zero state or in opposite states.

References Cited in the file of this patent

UNITED STATES PATENTS

| | | |
|---|---|---|
| 2,734,684 | Ross et al. | Feb. 14, 1956 |
| 2,879,001 | Weinberger et al. | Mar. 24, 1959 |
| 2,923,476 | Ketchledge | Feb. 2, 1960 |
| 2,941,721 | Schart et al. | June 21, 1960 |
| 2,959,768 | White et al. | Nov. 8, 1960 |

OTHER REFERENCES

Richards: Arithmetic Operations in Digital Computers, D. Van Nostrand Co., Inc., 1955, pages 52–56 and 89–92.

Phister: Logical Design of Digital Computers, John Wiley and Sons, 1958, pages 45 and 46.